Nov. 22, 1949  E. E. REDINGTON  2,488,830
PLOW MECHANISM FOR EXTRUSION APPARATUS
Filed March 27, 1947  5 Sheets-Sheet 3
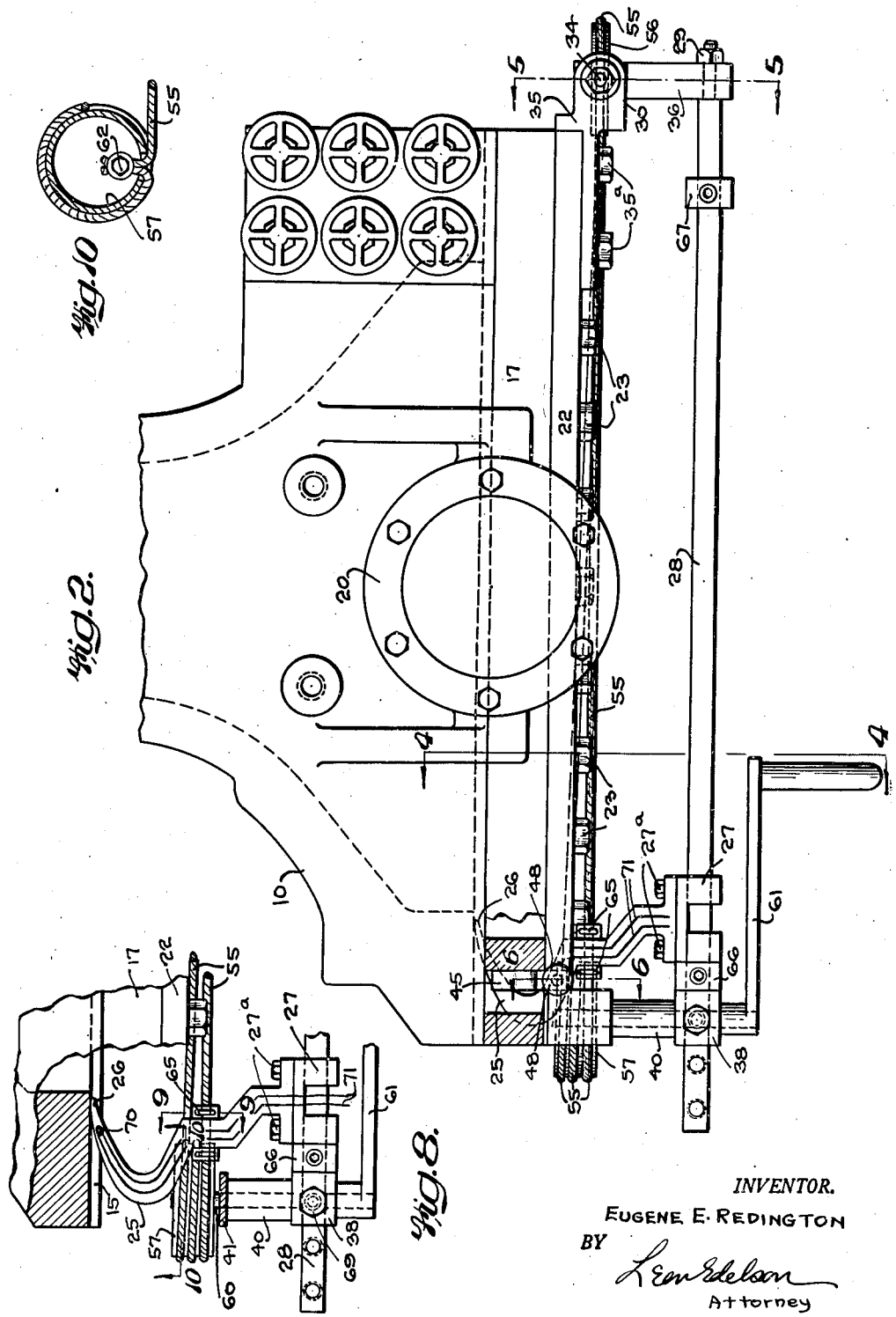
INVENTOR.
EUGENE E. REDINGTON
BY
Lew Edelson
Attorney Nov. 22, 1949     E. E. REDINGTON     2,488,830
PLOW MECHANISM FOR EXTRUSION APPARATUS
Filed March 27, 1947     5 Sheets-Sheet 4
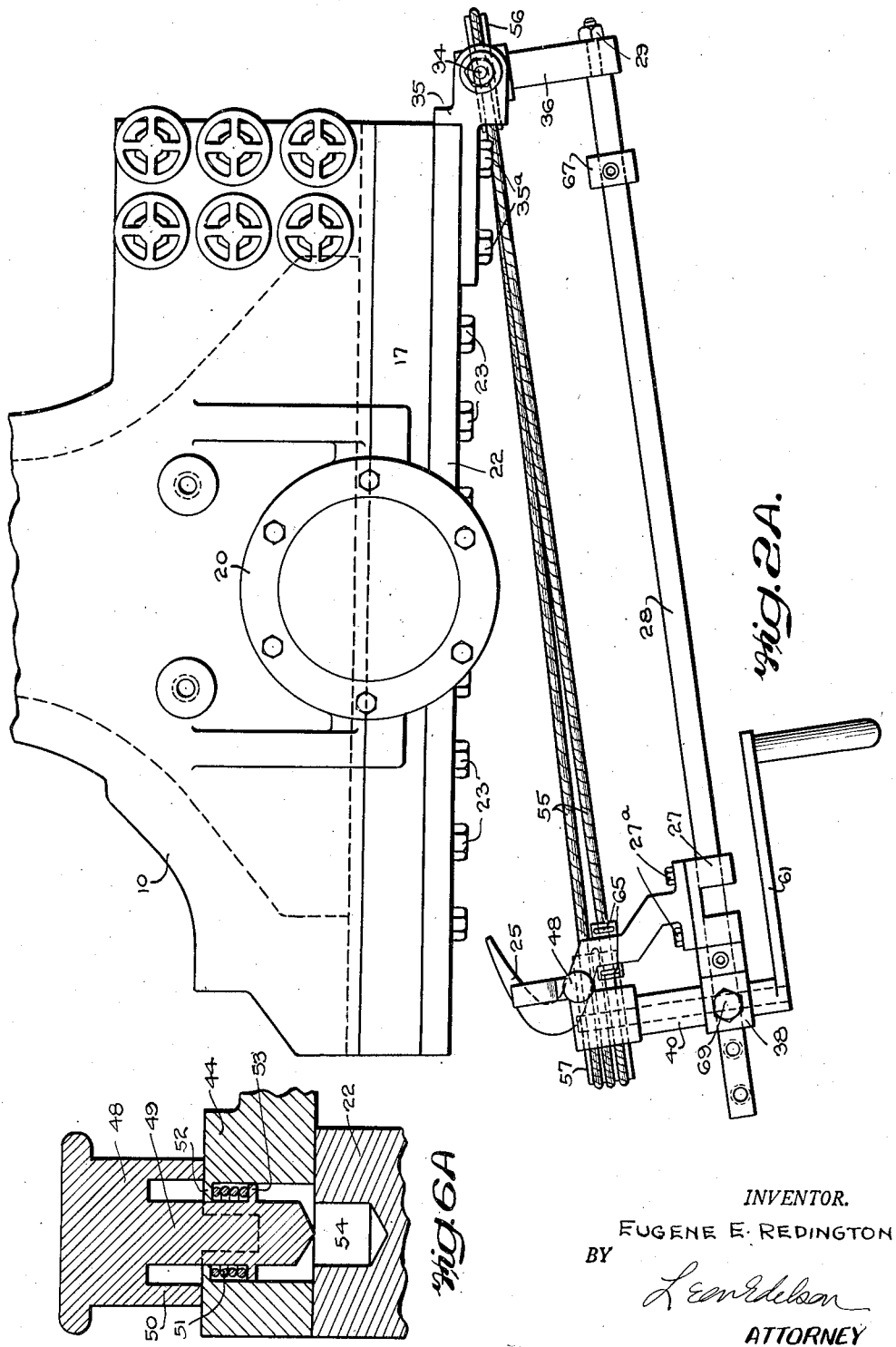
INVENTOR.
EUGENE E. REDINGTON
BY
ATTORNEY Nov. 22, 1949     E. E. REDINGTON     2,488,830
PLOW MECHANISM FOR EXTRUSION APPARATUS
Filed March 27, 1947     5 Sheets-Sheet 5
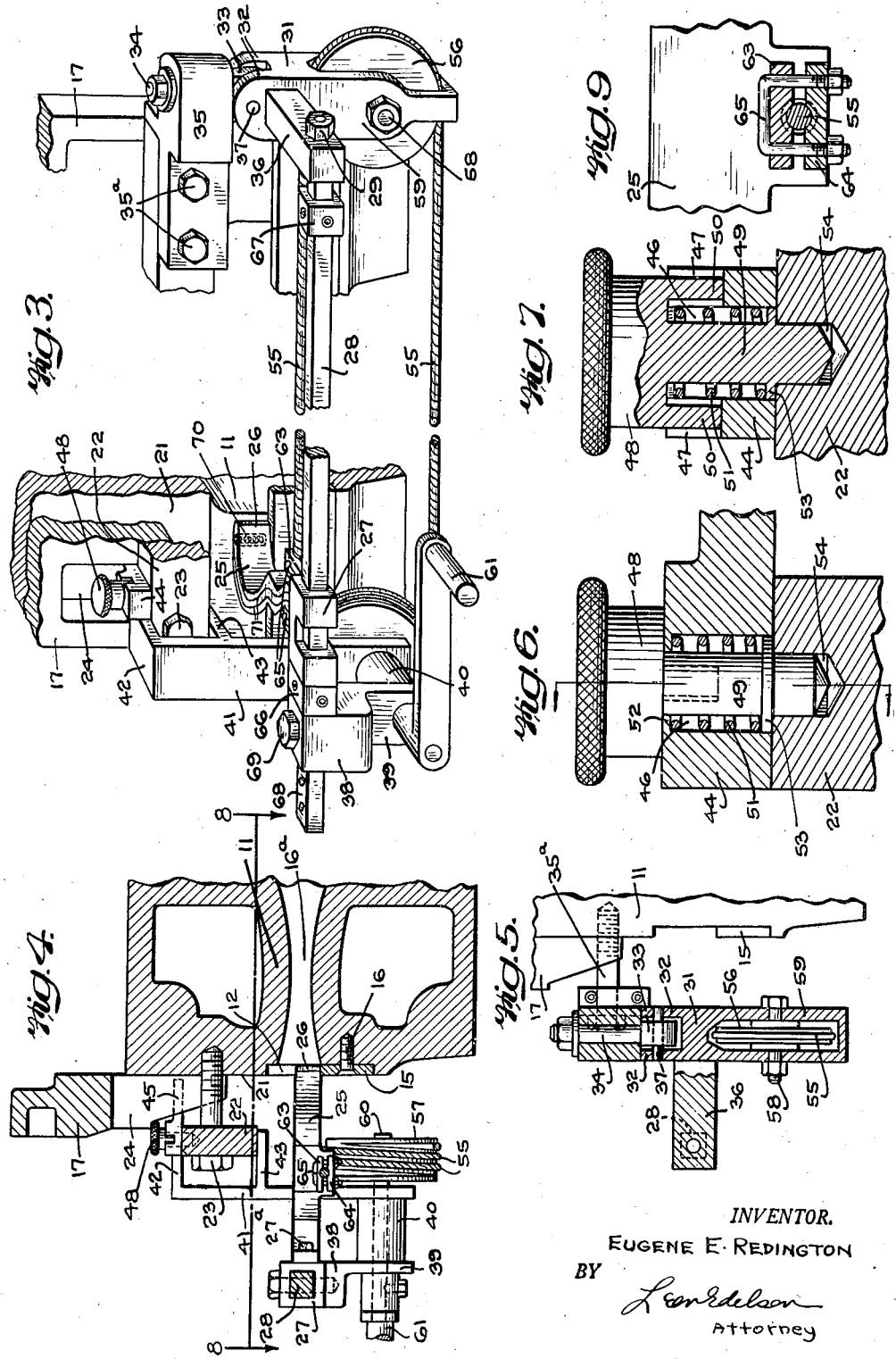
INVENTOR.
EUGENE E. REDINGTON
BY
Leon Edelson
Attorney Patented Nov. 22, 1949

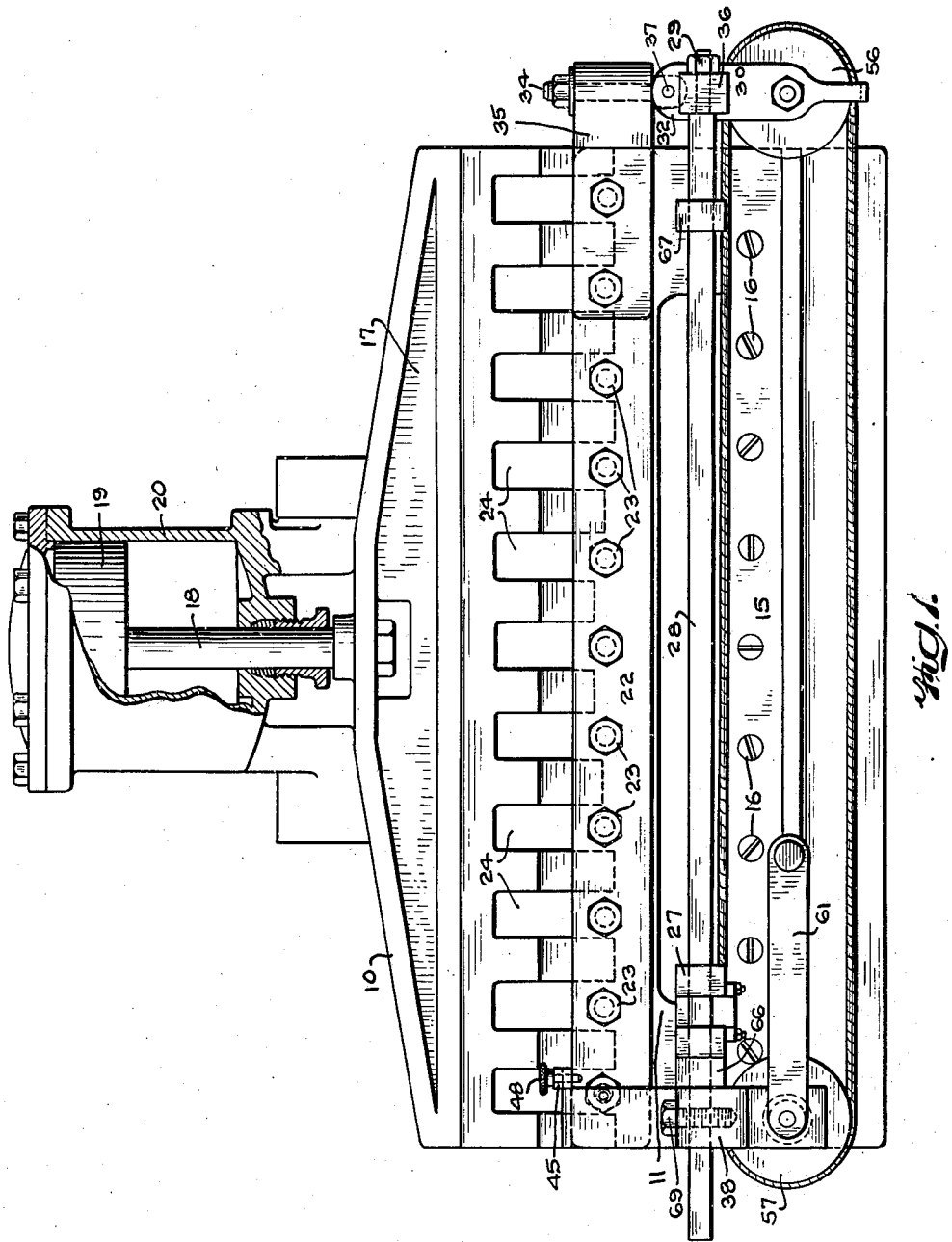

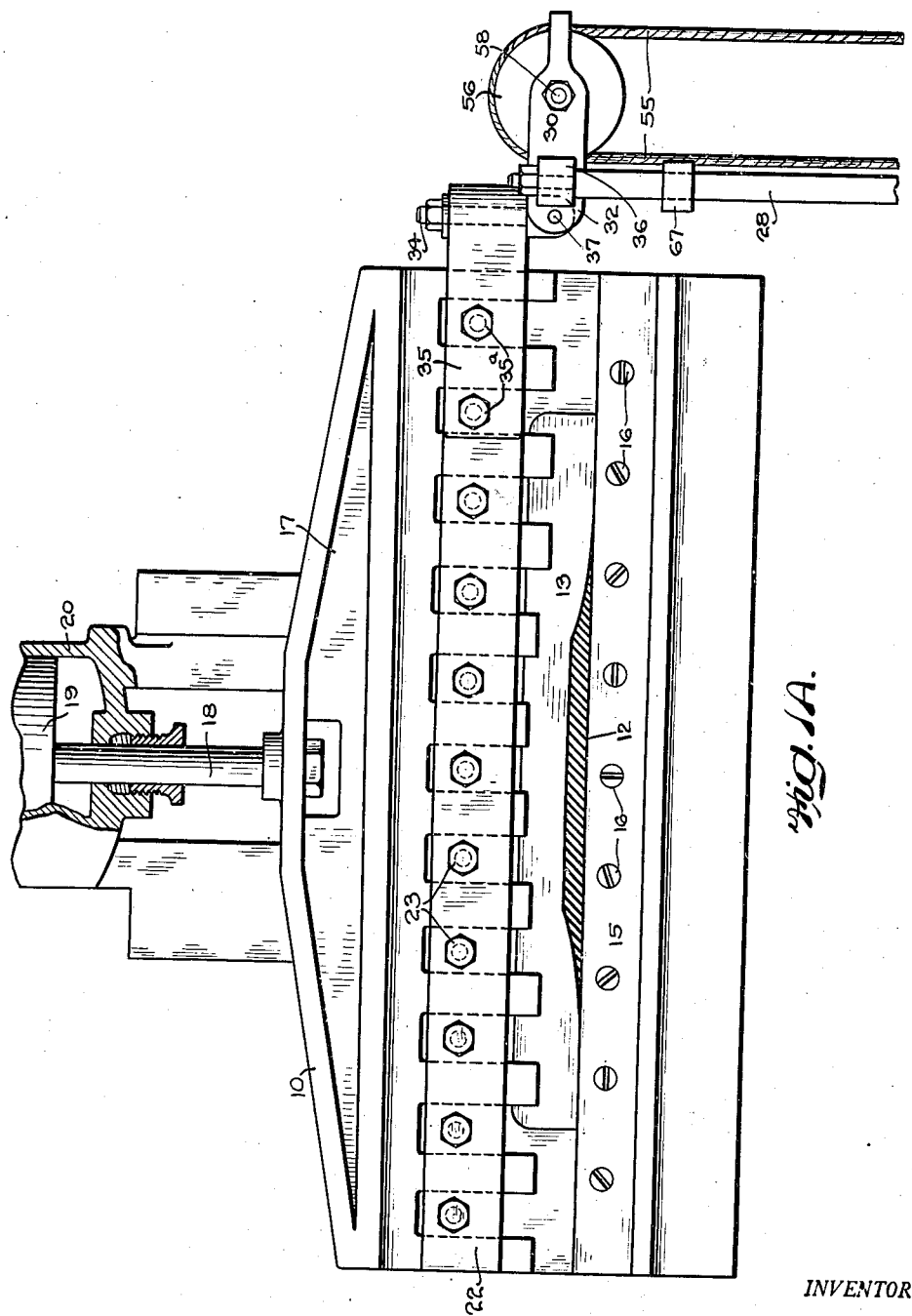

2,488,830

UNITED STATES PATENT OFFICE 2,488,830

PLOW MECHANISM FOR EXTRUSION APPARATUS

Eugene E. Redington, Conshohocken, Pa., assignor to Lee Rubber & Tire Corporation, Conshohocken, Pa., a corporation of New York Application March 27, 1947, Serial No. 737,638

13 Claims. (Cl. 18—12)

This invention relates generally to apparatus for extruding plastic stock, such as rubber, and more particularly to improvements in such apparatus designed for the extrusion of rubber treads employed in the manufacture of vehicle tires.

An important step in the manufacture of vehicle tires is the production of the tread stock, this being normally produced in the form of a continuous length of rubber stock formed to proper cross-sectional shape by extruding the stock through a suitable die opening provided in the head of the extruding apparatus. Inasmuch as the cross-sectional shape and dimension of the extruded tread varies with changes in size of the tire, it is the common practice in the art to furnish a particular extruding apparatus or so-called tubing machine with a number of interchangeable die elements which are respectively adapted to provide the apparatus with die openings of different shape and size, the selection of a particular die element to be used being determined by the desired shape and size of the tread stock to be produced in a given run.

To facilitate removal of a die for replacement by another or for any other purpose, the pressure of the stock in the head of the extruding machine is employed to shift the die outwardly of its seat, such pressure normally resulting in the formation of a tongue-like strip of excess stock extending beyond the die opening and across the die seat. In order to properly replace the die in its seat, it becomes necessary, of course, to remove this excess stock. Heretofore and prior to the present invention, the removal of this excess stock from the region of the die seat has always been a tedious and laborious task, resulting in considerable loss of production time. Also, unless the die seat is completely cleared of all accumulation of stock therein, the proper replacement of the die is difficult, if not impossible, it being a not infrequent occurrence to warp or otherwise damage the die when it is attempted to force the same into its seat in the presence of excess stock in the region of the die seat. Moreover, even should the die be uninjured per se under such circumstances, its seating may be so faulty as to materially alter the die opening through which the stock is extruded with the result that the extruded stock is not clearly defined in its cross-sectional shape or is of a shape other than that desired.

It is among the objects of the present invention to provide means which obviates the aforementioned difficulties and which insures ready and easy removal of every vestige of excess stock from the die seat in order to facilitate and insure proper seating of the die therein; the means of the present invention being generally in the form of a plow operatively associated with the extrusion head of the tubing machine for clearly cutting away all of the excess stock which may have become lodged in the die seat and which would interfere with proper replacement of a die therein.

Other objects of the present invention are to provide a device of the character aforesaid which is simple in construction, efficient in use and capable of operation with a minimum expenditure of labor and time, thus effecting considerable and material economies in the production of the extruded stock.

Still other objects and advantages of the present invention will appear more fully hereinafter, it being understood that the present invention consists substantially in the combination, construction, location and general arrangement of parts, all as will clearly appear in the detailed description which follows, as shown in the accompanying drawings and as finally pointed out in the appended claims. In the accompanying drawings, the present invention has been shown as applied to an extruding apparatus or tubing machine such as is employed in the manufacture of rubber tread stock for vehicle tires, but it is to be understood that the present invention is in no sense limited in its application to the specific apparatus shown. In the said illustrative drawings:

Figure 1 is a front elevational view, partially in section, of an extruding apparatus having operatively associated therewith the excess stock clearing device constructed in accordance with and embodying the principles of the present invention;

Figure 1A is a view similar to Figure 1 showing the die plate in position and the stock clearing device suspended in inoperative position;

Figure 2 is a top plan view, also partially in section, of the extruding head of the apparatus shown in Figure 1;

Figure 2A is a view similar to Figure 2 showing the stock clearing device in outwardly swung inoperative position relatively to the extruding head of the tubing machine;

Figure 3 is a perspective view showing the mechanism of the present invention in association with the extruding apparatus;

Figure 4 is a vertical sectional view taken along the line 4—4 of Figure 2;

Figure 5 is a vertical sectional view taken along the line 5—5 of Figure 2;

Figure 6 is a sectional view of the detent as taken along the line 6—6 of Figure 2;

Figure 6A is a view showing the detent raised into non-engaging position with respect to the fixed frame of the tubing machine;

Figure 7 is another sectional view of the detent as taken along the line 7—7 of Figure 6;

Figure 8 is a view taken substantially along the line 8—8 of Figure 4; and

Figures 9 and 10 are sectional views of details as taken respectively along the lines 9—9 and 10—10 of Figure 8.

Referring now more particularly to the drawings, it will be observed that the present invention is shown in operative association with an extruding machine indicated generally by the reference numeral 10, this machine being of convential form in that it is provided with an extruding head 11 to which plastic stock to be extruded into predetermined shape, such as uncured rubber, is supplied under pressure from a suitable source of supply not shown. The shape of the extruded stock is determined by the die opening 12 (see Figure 1A) in the head of the machine, this die opening being varied in shape and size as desired depending upon the particular die employed in the machine. One such die, designated 13, is shown in Figure 1A, this die being generally in the form of a removable flat plate having its lower edge notched or cut away to form the die opening 12, the removable die plate 13 being normally disposed in coplanar, edge to edge relation with respect to a stationary die plate 15 fixed to the extrusion head of the machine by the screws 16.

In order to retain the removable die plate 13 in fixed position as shown in Figure 1A so that the die opening 12 is in registry with the throat 16a through which the stock is forced for extrusion through said die opening, a fluid-pressure operated die clamp 17 is employed. This die clamp 17 is supported by the stem 18 of a fluid-pressure actuated piston 19 operating within a stationary cylinder 20, the arrangement being such that upon the supply of fluid pressure to the cylinder the die clamp may be raised into its position shown in Figures 1 and 4 to permit removal of the die plate 13 or lowered into its position shown in Figure 1A to securely retain the said die plate in place. It will be observed that the die clamp 17, when lowered into clamping position, is wedged between the front face 21 of the tubing machine and a jaw plate 22 mounted upon said face in spaced relation thereto, the jaw plate 22 being secured in position by a plurality of bolts 23. The lower portion of the die clamp 17 is provided with a series of longitudinally spaced notches 24 through which the bolts 23 respectively project when the die clamp is lowered into die-clamping position. Inasmuch as all of the foregoing parts are more or less conventional in tubing machines of the character to which the present invention relates, further detailed description thereof is not believed to be necessary except to point out that in use of the tubing machine the plastic stock which is delivered under suitable pressure to and through the throat 16a completely fills the die opening 12, and that the pressure of the material through the die opening assists in effecting removal of the die plate 13 when the die clamp 17 is raised upwardly out of die holding position. Upon removal of the die plate some of the stock extends through the die opening 12 to overlie the upper edge of the lower stationary die plate 15 and unless such excess stock is removed it becomes difficult, if not impossible, to properly replace the die plate 13.

The device of the present invention is designed to expedite the removal of this excess material which extrudes from the die opening when the die plate 13 is removed and such device will now be more particularly described. This device essentially includes a plow element 25 in the form of an arcuately shaped member having a relatively sharp edge 26 normally disposed in vertically extending position and adapted to be pulled across the face of the die opening 12 to scrape or shear off all excess material which immediately overlies the upper edge of the stationary die plate 15, thereby providing a clean seat for replacement of the upper removable die 13.

This plow element is provided at its outer end with a supporting member 27 slidably mounted on a rail 28, the plow being secured to its supporting member by the screws 27a. The rail 28 is suitably supported in spaced parallel relation with respect to the die plate 15, and is preferably of non-circular cross-section to prevent rotation of the plow relatively to the rail. The rail 28 extends across the full length of the extrusion head of the tubing machine, with one end thereof secured, as at 29, to a bracket 30. This bracket 30 is mounted upon the frame of the tubing machine in such manner as to permit the rail 28 to be swung outwardly away from the die plate 15, as shown in Figure 2A, and thence downwardly, as shown in Figure 1A, this latter position being the normal one assumed when the extruding machine is in operation with the upper die plate 13 clamped securely in place. To this end the bracket 30 is provided with a main body member 31 which is kerfed at its upper end to provide a pair of ears 32—32 which embrace a lug 33 formed at the lower end of a swivel bolt 34 extending through a mounting plate 35 secured, as by the bolts 35a—35a, to the machine frame. Secured to the body member 31 of the bracket 30 is a laterally extending arm 36 to which is secured, in turn, the end of the rail 28 as previously mentioned. A pivot pin 37 extending through the ears 32—32 of the bracket body member 31 and the lug 33 of the vertically extending swivel bolt 34 permits swiveling of the rail assembly about the horizontal axis of the pivot pin 37, so as to permit the rail assembly to drop into inoperative position as shown in Figure 1A when it is swung outwardly from the extruding machine about the vertical axis of the swivel bolt 34.

The opposite free end of the rail 28 is non-rotatably fitted with a bracket 38 having a depending portion 39 to which is fixedly secured a stub 40. Secured to the inner end of this stub 40 is an additional bracket element 41 having at its upper end a pair of vertically spaced parallel arms 42 and 43 which are respectively adapted to snugly engage the upper and lower edges of the jaw plate 22 when the rail assembly is swung into its operative position shown in Figures 1, 2 and 3. The upper arm 42 of the bracket element 41 is formed at one edge thereof with a detent block 44 having an arm 45 adapted to project through one of the notches 24 of the die clamp 17 for engagement with the front surface of the machine frame, the arm 45 thus serving as a stop to limit inward movement of the rail assembly and its associated plow 25.

The detent block 44 is provided with a vertically extending socket 46 opening from the bottom of the block, while the upper portion of the block is transversely notched to provide the socket 46 with a pair of diametrically opposed seats 47—47. Fitted in the detent block 44 is a spring-pressed detent 48 having a central shank 49 flanked by diametrically opposed key elements 50—50, these latter being adapted, respectively to be retained in the seats 47—47 by the action of a coiled compression spring 51 embracing the detent shank 49 and compressed between a flange 52 formed at the top of the detent socket 46 and a radial flange 53 formed on the detent shank 49, the lower end of which normally projects into a recess 54 provided therefor in the upper edge of the die clamp jaw plate 22. It will be apparent from the arrangement just described that when the rail assembly is swung inwardly into its operative position shown in Figures 1, 2 and 3, upon engagement of the detent 49 with its retaining recess 54 in the jaw plate 22 the rail assembly will be held securely in position with the sharp edge of the plow in close engagement with the surface of the machine to be scraped free of excess stock material. To release the detent from its holding position so as to permit the rail assembly to be swung outwardly into its inoperative position shown in Figure 2A, it is merely necessary to lift the body of the detent upwardly against the restraining effort of the spring 51 whereby to free the detent keys 50—50 from their seats 47—47 and the lower end of the shank 49 from its seat 54. By rotating the lifted detent through an angle of approximately 90 degrees, as shown in Figure 6A, the detent will be held secured in inoperative position.

In order to actuate the plow 25 and effect its travel across the length of the die opening, a cable pull mechanism is provided as appears most clearly in Figure 3. This cable pull mechanism essentially consists of a cable 55 which suitably traverses a pair of sheaves 56 and 57 rotatably mounted at opposite ends of the rail assembly. Thus, the sheave 56, which is preferably single-grooved, is rotatably journalled, as at 58, within a yoke 59 formed as an integral part of the body member 31 of the bracket 30, while the sheave 57, which is preferably multiple-grooved, is keyed to a shaft 60 rotatably journalled in the stub 40 of the bracket 38 carried on the free end of the rail 28, the outer end of the shaft 60 being provided with a suitable operating handle 61 by means of which rotation is imparted, in one direction or the other, to the sheave 57. The opposite free ends of the cable 55 are secured to the sheave 57 in any suitable manner, as for, example, by projecting them interiorly of the sheave drum for securement together, as at 62 (see Figure 10), the general arrangement being such that upon rotation of the handle 61 in one direction or the other, the upper length of the cable 55 extending between the sheaves 56 and 57 will be correspondingly shifted in the desired direction.

The plow 25 is secured to the upper length of the cable 55 in any suitable manner, as, for example, by a clamping device such as is shown in Figure 9, consisting of plates 63 respectively clamped to basal elements 64 projecting from opposite sides of the plow by means of U-bolts 65. The rail 28 is fitted adjacent opposite ends thereof with positionally adjustable stops 66 and 67 which coact to limit the extent of travel of the plow lengthwise along the rail, it being apparent that as the handle 61 is rotated in clockwise direction (see Figure 3) the plow 25 will be drawn lengthwise along the rail 28 toward the right hand stop 67 by means of the cable 55 traveling about the sheaves 56—57. Conversely, when the handle 61 is reversed in its rotation, the plow will be drawn toward the left by means of the cable.

In order to provide for variations in the effective length of the plow mechanism to adapt it to various sizes of extrusion machine, the rail 28 may be extended, as at 68, to provide for positional adjustment of the bracket 38 thereon, the latter being secured in its adjusted position by a screw 69.

In operation of the device, it will be assumed, of course, that the upper die plate 13 has been removed from its seat immediately above the lower stationary die plate 15 and that it is desired to remove the excess stock material overlying the edge of said die plate 15. The rail assembly with its associated plow 25 will then be locked in position as shown in Figures 1, 2 and 3 by means of the detent as hereinbefore described, the plow 25 being retracted to its starting position as shown. Thereupon, upon rotation of the handle 61, the plow will be pulled across the length of the die opening immediately above the upper edge of the die plate 15 and thus will cleanly scrape or shear away the excess stock material. Where the stock material consists of uncured rubber or other material adapted to be softened by heat, it is preferable to heat the shearing edge of the plow, this being readily accomplished by incorporating in the plow an electrical resistance unit 70 to serve as a source of controlled heat for the plow, current being supplied thereto by the conductor leads 71—71.

Having completed the operation of clearing away the excess stock material, the rail assembly with its associated plow is first swung outwardly of the tubing machine about the swivel bolt 34 and then dropped about the pivot 37 into its depending position as shown in Figure 1A, in which latter position the plow mechanism is entirely free of the operating head of the tubing machine so as not to interfere with replacement in operative position of the removable die plate 13.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In an extruding apparatus of the character described having an opening defined by a removable die plate through which plastic stock is extruded, mechanism for removing excess stock projecting through the die opening of the apparatus and interfering with proper seating of the die plate in position, said mechanism including a plow element, means for guiding said plow element along a rectilinear path of movement, means for drawing said plow element along said rectilinear path, and means for shifting said mechanism to one side of and into non-interfering position with respect to said die opening.

2. In an extruding apparatus of the character described having an opening defined by a removable die through which plastic stock is extruded, mechanism for removing excess stock from the region normally occupied by said removable die, said mechanism including a plow element adapted to shear the excess stock from said region, means for guiding said plow element along a fixed path of movement paralleling the die seat while maintaining the stock shearing edge of said plow in close relation to the surface of the extruding apparatus against which the die is normally mounted, means for drawing said plow element along said fixed path of movement, and means for shifting said mechanism to one side of and into non-interfering position with respect to said die opening.

3. In an extruding apparatus of the character described having a stock extruding opening in the head thereof defined by a removable die, a plow element adapted to shear away excess stock extending into the region normally occupied by said removable die, a rail extending in parallel relation with respect to the seat normally occupied by said removable die, said plow element being slidably mounted upon said rail for rectilinear movement therealong, means for shifting said plow element along said rail, and means for shifting said rail to one side of and into non-interfering position with respect to said die opening.

4. In an extruding apparatus of the character described having a stock extruding opening in the head thereof defined by a removable die, a plow element adapted to shear away excess stock extending into the region normally occupied by said removable die, a rail extending in parallel relation with respect to the seat normally occupied by said removable die, said plow element being slidably mounted upon said rail for rectilinear movement therealong, means for shifting said plow element along said rail, said plow element having a main body portion of generally arcuate shape terminating in a relatively sharp edge of a width exceeding the thickness of the excess stock to be removed, and means for shifting said rail to one side of and into non-interfering position with respect to said die opening.

5. In an extruding apparatus of the character described having a stock extruding opening in the head thereof defined by a removable die, a plow element adapted to shear away excess stock extending into the region normally occupied by said removable die, a swingable rail adapted for disposition in parallel relation with respect to the seat normally occupied by said removable die, said plow element being slidably mounted upon said rail for rectilinear movement along the die seat, and means for drawing said plow lengthwise of said rail to shear away the excess stock overlying said die seat.

6. In an extruding apparatus of the character described having a stock extruding opening in the head thereof defined by a removable die, a plow element adapted to shear away excess stock overlying the seat normally occupied by said removable die, a swingable rail adapted to be swung from a position non-interfering with normal operation of the extruding apparatus into operative position in advance of the die opening and in parallel relation with respect to the die seat aforesaid, said plow element being shiftable along said rail to shear away excess stock overlying said die seat, and means for locking said rail in fixed operative position.

7. In an extruding apparatus of the character described having a stock extruding opening in the head thereof defined by a removable die, a plow element adapted to shear away excess stock overlying the seat normally occupied by said removable die, a swingable rail adapted to be swung from a position non-interfering with normal operation of the extruding apparatus into operative position in advance of the die opening and in parallel relation with respect to the die seat aforesaid, said plow element being shiftable along said rail to shear away excess stock overlying said die seat, and means for locking said rail in fixed operative position, said last mentioned means including a spring-pressed detent engageable with a relatively fixed part of the extruding apparatus.

8. In an extruding apparatus of the character described having a stock extruding opening in the head thereof defined by a removable die, a plow element adapted to shear away excess stock overlying the seat normally occupied by said die, and means for guiding said plow element along said seat, said plow element extending laterally of said guide means into engagement with said die seat and being provided with a relatively sharp edge of a width exceeding the thickness of the excess stock, and means for releasably securing said guide means in fixed position for shifting of said plow element rectilinearly along a line paralleling the face of said die seat.

9. In an extruding apparatus of the character described having a stock extruding opening in the head thereof defined by a removable die, a plow element adapted to shear away excess stock overlying the seat normally occupied by said die, means for guiding said plow element along said seat, said plow element being provided with a relatively sharp edge of a width exceeding the thickness of the excess stock, means for heating the sharpened edge of said plow element, and means for releasably securing said guide means in fixed position for shifting of said plow element rectilinearly along a line paralleling the face of said die seat.

10. In an extruding apparatus of the character described having a stock extruding opening in the head thereof defined by a removable die, a plow element adapted to shear away excess stock overlying the seat normally occupied by said die, means for guiding said plow element along said seat including a rail fitted on opposite ends thereof with sheaves, and cable means traversing said sheaves for shifting said plow element along its guided path of movement.

11. In an extruding apparatus of the character described having a stock extruding opening in the head thereof defined by a removable die, a plow adapted to shear away excess stock overlying the seat normally occupied by said die, and an operating mechanism for actuating said plow pivotally mounted upon the apparatus for disposition operatively in relation to the excess stock to be removed, said mechanism including a positionally adjustable rail along which the plow is shifted in one direction for shearing away the stock and in an opposite direction for relocating the plow at the starting point of its shearing stroke.

12. In an extruding apparatus of the character described having a stock extruding opening in the head thereof defined by a removable die, a plow adapted to shear away excess stock overlying the seat normally occupied by said die, and an operating mechanism for actuating said plow pivotally mounted upon the apparatus for disposition operatively in relation to the excess stock to be removed, said mechanism being adapted to be swung to one side of said die opening and thence downwardly into a suspended position non-interfering with normal operation of the extrusion apparatus.

13. In an extruding apparatus of the character described having a stock extruding opening in the head thereof defined by a removable die, a plow adapted to shear away excess stock overlying the seat normally occupied by said die, and an operating mechanism for actuating said plow pivotally mounted upon the apparatus for disposition operatively in relation to the excess stock to be removed, said mechanism including a rail upon which said plow is slidably mounted, a pair of cable sheaves spaced apart lengthwise relatively to said rail and a cable traversing said sheaves, said plow being secured to said cable for guided movement lengthwise of said rail.

EUGENE E. REDINGTON.

REFERENCES CITED

The following references are of record in the file of this patent:

UNITED STATES PATENTS

| Number | Name | Date |
| --- | --- | --- |
| 1,802,968 | Everett et al. | Apr. 28, 1931 |
| 1,932,200 | Allen | Oct. 24, 1933 |
| 2,215,435 | Hale | Sept. 17, 1940 |